Nov. 10, 1936.                P. KLAMP                2,060,087
MILL FOR ROLLING ARTICLES OF CIRCULAR SECTION AND IRREGULAR PROFILE
                     Filed June 2, 1934        2 Sheets-Sheet 2
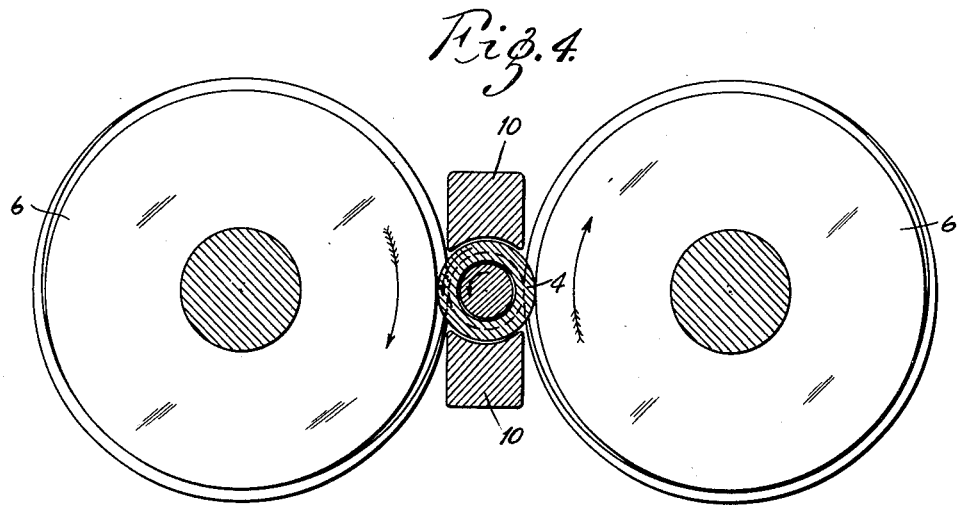
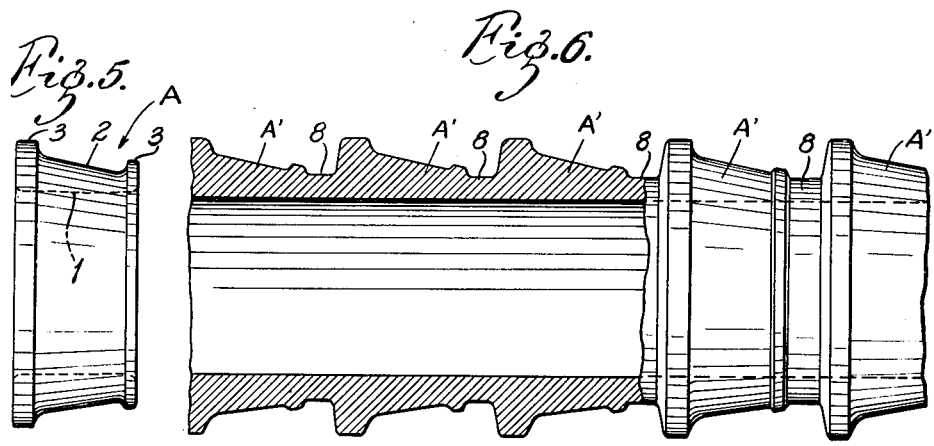
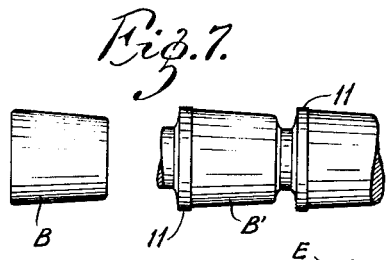
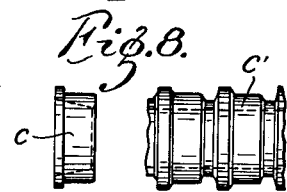
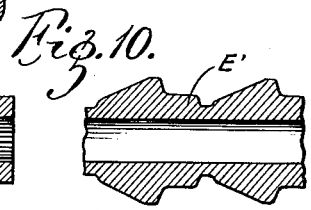
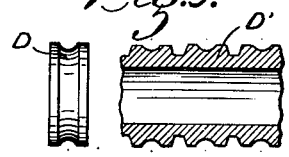
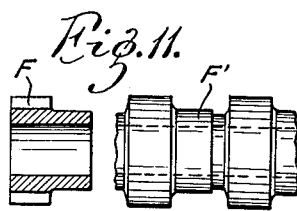
INVENTOR:
HIS ATTORNEYS.

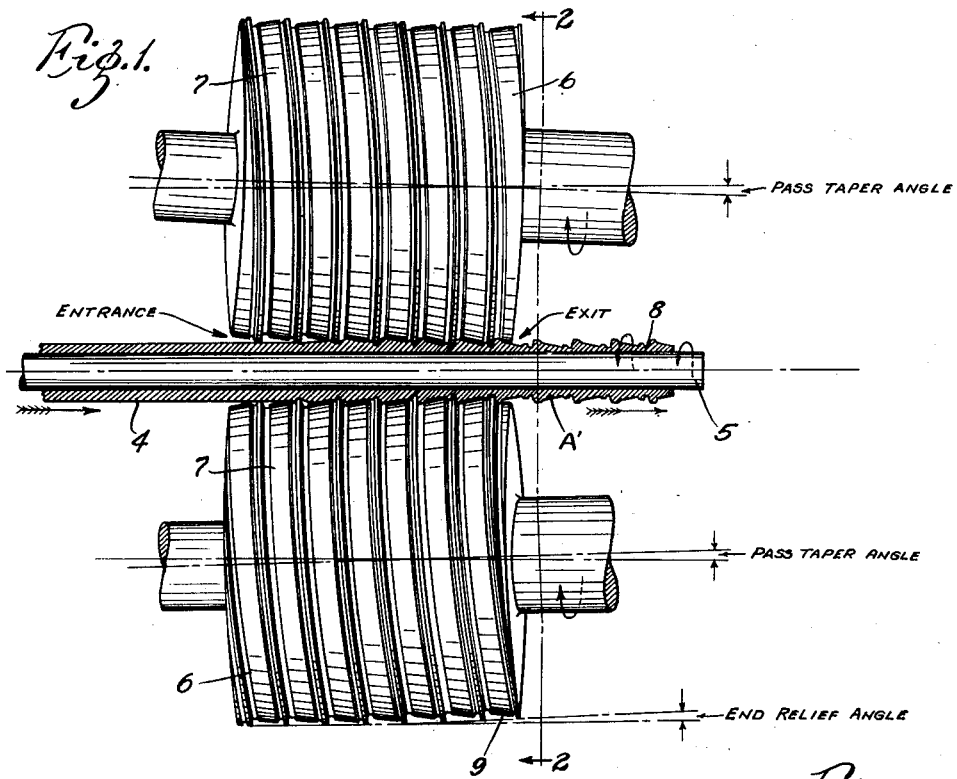
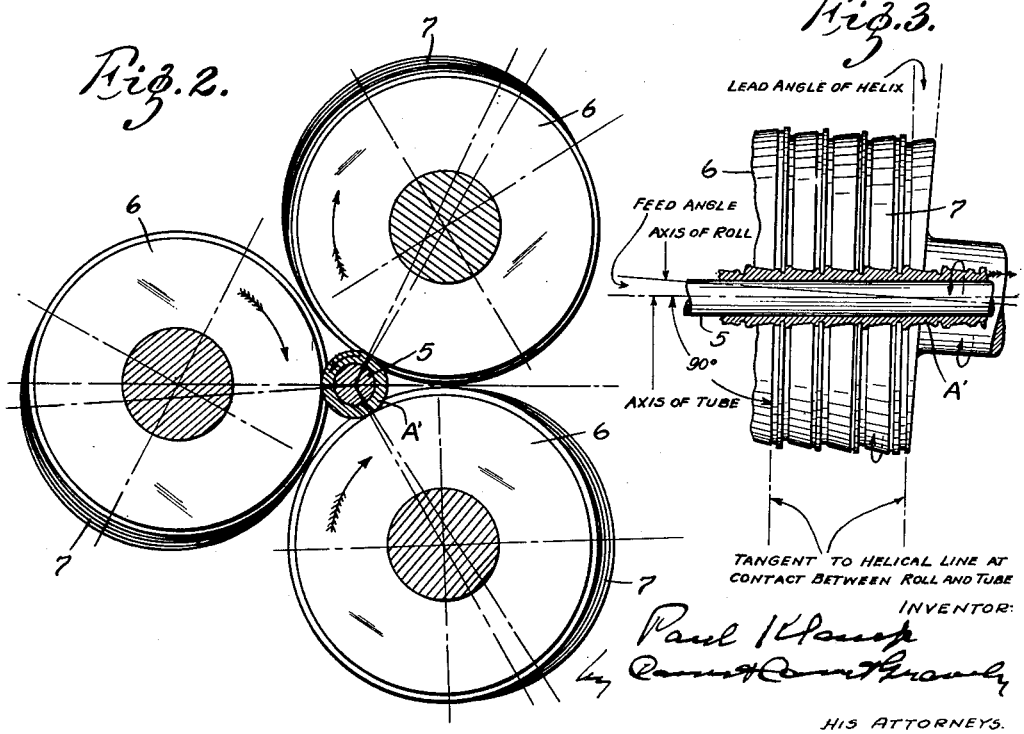

Patented Nov. 10, 1936

2,060,087

UNITED STATES PATENT OFFICE

2,060,087

MILL FOR ROLLING ARTICLES OF CIRCULAR SECTION AND IRREGULAR PROFILE

Paul Klamp, Canton, Ohio, assignor to The Timken Roller Bearing Company, Canton, Ohio, a corporation of Ohio Application June 2, 1934, Serial No. 728,690

7 Claims. (Cl. 80—23)

Heretofore it has been the usual practice to manufacture circular articles with longitudinally spaced annular ribs or depressions individually and by suitable cutting or forging operations. The principal object of the present invention is to devise a process whereby bars or tubes may be continuously rolled into a connected series of readily separable preformed units or blanks of approximately the size and profile of the finished article, and specifically to adapt the work piece to be mounted in a screw machine so that its endmost unit or blank can be readily positioned and machined and afterwards severed from the work piece.

The invention consists principally in feeding a bar or tube longitudinally between helical profile surfaces that revolve on axes disposed at a small angle to the axis of the work, said helical surfaces having a lead angle substantially equal to said first mentioned angle. It also consists in the steps and operations herein described and claimed.

In the accompanying drawings, which form part of this specification and wherein like reference numerals refer to like parts wherever they occur, Fig. 1 is a somewhat diagrammatic view of a tube in process of conversion into a profile product of circular section, the tube being shown in longitudinal section and the work rolls and mandrel being shown in elevation;

Fig. 2 is a cross-section on the line 2—2 in Fig. 1;

Fig. 3 is a diagram illustrating the relation of the lead angle of the profile band of the work roll to the feed angle of the roll;

Fig. 4 is a view similar to Fig. 2, illustrating the operation with two work rolls instead of three;

Fig. 5 illustrates a roller bearing cone;

Fig. 6 illustrates the work stock converted into a connected series of bearing cone blanks specially adapted for machining in an automatic screw machine, Figs. 7 to 11 show the work stock converted into connected series of blanks for other articles, all of them being profiled and of circular section.

Figs. 1, 2 and 3 of the accompanying drawings illustrate my process as applied to the production of blanks for a common type of roller bearing cones or inner bearing members. As illustrated in Fig. 5, such a "cone" has a central bore 1, a conical raceway surface 2 concentric therewith and an annular rib 3 at each end thereof. According to the present invention, a continuous series of connected blanks or units A' of substantially the size and shape of the finished cone A is produced by continuous cross-rolling of a suitable tube 4.

According to the present invention, the tube 4 is mounted on a rotatable mandrel 5 and fed endwise between the ends of work rolls 6 which rotate on axes that are disposed at a small angle to the axis of the tube or work. Tube mills are well-known wherein the work stock is introduced endwise between the ends of working rolls, whose axes are arranged at a small angle to the axis of the work stock so as to automatically feed the work longitudinally and at the same time rotate it on its axis. This type of rolling mill can be readily modified to carry out the present process as will be apparent to those skilled in the art from the following description.

According to the present invention, the surface of each work roll 6 may be of general cylindrical form and is provided with a continuous helical band 7 that makes several complete turns and is of substantially the same profile as that of the article to be produced plus a marginal allowance between successive turns. Two or more of these work rolls 6, preferably three, are disposed at equal distances from the axis of the work 4 and from each other. Instead of being parallel with the axis of the work or pass, the axis of each roll is further therefrom at the work receiving end of the roll than at the delivery end thereof, in order to facilitate the entry of the work. This deviation from parallelism with the axis of the pass is commonly referred to as the "pass taper angle".

The axis of each work roll 6 does not lie in the plane of the axis of the work 4, but in a plane that makes a small angle therewith, say, about two to twelve degrees. This angle determines the rate of progress of the work through the mill and is commonly referred to as the "feed angle".

As stated above, the rolling surface of my work roll is in the form of a continuous helical band of approximately the same profile as the desired product with a small helical marginal addition or allowance between successive convolutions of such profile designed to produce in the work stock a neck or connection 8 between the successive profiled units or blanks A' into which the work stock is converted. The lead or pitch, therefore, of the helical band 7 is equal to the length of the individual unit or blank A' plus the allowance for the connecting neck 8. According to my invention, the lead angle of the helical band 7 is made approximately equal to the feed angle; that is, a straight line tangent to the work roll helix at its point of contact with the work makes an angle with a plane perpendicular to the axis of the roll (namely, the lead angle) equal to the angle that the axis of the work makes with the axis of the roll (namely, the feed angle). In consequence of this relation, the locus of all points of contact of a helical line on the rotating work roll with the rotating and advancing work is a circle in a plane perpendicular to the axis of the work. By this arrangement, the forward movement of the work 4 by the work rolls 6, due to the feed angle, is at the same rate as if the work were moved by the profiled helical band 7 forward in a straight line; and consequently the profile of the work roll is impressed on the surface of the work in a series of annular elevations and depressions of circular section.

Thus, the factors that determine the proper lead angle are first, the lead or pitch which, in turn, is the length of the desired unit blank plus an allowance for its connecting neck and, second, the feed angle of the rolls which determines the forward progress of the work. With these factors, it is a simple matter to determine the diameter of the work roll. By this arrangement, each turn of the work roll 6 feeds the tube 4 forward a distance equal to the pitch of the helical band 7 and with practically no longitudinal slip along the roll profile. Thus, the forward feed of the work is so correlated with the helical profile of the rolling surface that there is no relative movement in an axial direction between them and, consequently, the profile of the rolling surface is impressed on the work in the form of annular or circular bands in planes at right angles to the axis of the work.

Each of the work rolls 6 has its delivery end relieved or reduced, as at 9, in diameter for a distance far enough back to allow the work to clear the rolls without marring the profile. This slight deviation from the general cylindrical surface of the roll is referred to as the "end relief angle".

In operation, the tube 4 is mounted on a mandrel and fed endwise between the spread receiving ends of the rolls 6. When the rolls grip the tube, they feed it forward a distance equal to the pitch or lead of the rolling surface for each revolution of the rolls, so that as many successive portions of the tube are being simultaneously rolled as there are complete turns of the helical rolling band 7. For the same reason, the effect on the roll is to produce the same profile as that of the rolling surface without any helical or longitudinal displacement except the slight local displacement occasioned by forcing the metal from the places of reduced diameter of the work to adjacent places of greater diameter of the work. Instead of the profiled band 7 being of helical form, however, as on the work roll, the profiled band on the work is circular and is repeated serially in the form of circular or annular elevations and depressions in planes at right angles to the axis of the work. In other words, the work comprises a continuous series of units or blanks whose ribs and depressions are parallel. In this way, the operation is continuous and the entire tube is converted into a continuous integral series of blanks of substantially the size and profile of the finished article spaced apart by the necks or connecting portions. The work, in this form of a continuous series of blanks, is well adapted for completion and separation of each endmost unit in succession by an automatic screw machine, whose work is greatly lessened due to the rolling of the blank and the connecting neck. Besides there is a great saving of material and labor and less stock is spoiled because the blank is adapted to effect a more certain feed of the work.

The process has been hereinbefore described as carried out with three work rolls. In case two work rolls are used, it is necessary to steady the work through the rolls with upper and lower guides 10 as illustrated in Fig. 4. Instead of two or three rolls, the mill may have a larger number of rolls. While I have described the work rolls as of general cylindrical form, they may be of other forms, such, for instance, as conical or longitudinally convex or the like.

While I have described my process as applied to the production of blanks for roller bearing cones, it is obvious that it is applicable to the production of other solid or hollow circular articles of various profiles. For instance, Fig. 7 illustrates an ordinary roller bearing roller B and a serial blank B' for the production thereof. It is noted, where the individual unit is of approximately the shape of the conical roller, the large end thereof has a raised cylindrical band 11 intended to afford engagement with the feed collet of the automatic screw machine. It is also noted that these rollers are made from solid stock.

Fig. 8 illustrates an ordinary type of cup C for conical roller bearings and the serial blank C' from which the same is made. The serial blank is made up of connected units of approximately the size and shape of a finished article connected together by reduced neck portions and having a cylindrical bore extending through them. Individual blanks are finished by converting their inner surface into conical form.

Fig. 9 shows a common type of inner raceway member for ball bearings D and the serial blank D' of my process from which it may be made.

Fig. 10 illustrates a common type of bevel pinion E and a serial blank E' of my process from which it may be made. Likewise, Fig. 11 illustrates a common type of spur pinion F and the blank F' of my process from which it may be made. Obviously, other profiled articles of circular section may be produced in like manner.

It is a great merit of my process that it very rapidly and economically produces profiled blanks of circular section which heretofore had to be made individually by more expensive processes of forging or cutting. Another advantage of my process is that the grain of the metal in the product extends axially and substantially parallel with the surface thereof, and that the grain structure is of extreme density, resulting in superior strength and wearing qualities. Another advantage is that it is very economical in making parts of high-priced material that is at present wasted in the form of chips or cuttings or spoiled work. Besides, it is more rapid and more economical of labor.

No claim is made herein to the processes and products hereinbefore disclosed as the same constitute the subject matter of my copending application Serial No. 3719 filed January 28, 1935.

What I claim is:

1. A mill for cross-rolling stock into profiled work of circular cross-section, said mill comprising more than two equidistant work rolls arranged to form a pass, each of said rolls being disposed at an ordinary feed angle to said pass and having a profiled helical band of multiple turns and of a lead angle equal to the feed angle.

2. A mill for cross-rolling stock into profiled work of circular cross-section, said mill comprising more than two equidistant work rolls arranged to form a pass, each of said rolls being disposed at a feed angle of from two to twelve degrees to said pass and having a profiled helical band of multiple turns and of a lead angle equal to the feed angle, the delivery end portions of said rolls tapering sufficiently to relieve the work before the same leaves the pass.

3. A mill for cross-rolling profiled articles of circular section which comprises rolls set at a feed angle of from about two degrees to about twelve degrees to the axis of the pass and provided with a continuous helical surface of several turns and whose lead angle is substantially equal to said feed angle whereby the locus of all points of contact of a helical line on the rotating work roll with the rotating and advancing work is a circle in a plane substantially perpendicular to the axis of the work, the entrance end portions of said helical surfaces being arranged to admit the work between them and the delivery end portions tapering sufficiently to relieve the work before the work issues therefrom.

4. A mill for cross-rolling profiled articles of circular section which comprises rolls set at a feed angle of from about two degrees to about twelve degrees to the axis of the pass and provided with a continuous helical surface of several turns whose lead is the length of the desired article plus an allowance for cutting and whose lead angle is substantially equal to said feed angle whereby the locus of all points of contact of a helical line on the rotating work roll with the rotating and advancing work is a circle in a plane substantially perpendicular to the axis of the work, the entrance end portions of said helical surfaces being arranged to admit the work between them and the delivery end portions tapering sufficiently to relieve the work before the work issues therefrom.

5. A rolling mill for making roller bearing cones and like articles of circular section which comprises rolls set at a feed angle of from about two degrees to about twelve degrees to the axis of the pass and provided with a continuous helical surface of several turns of the same profile as such article plus a marginal allowance between successive turns and whose lead angle is substantially equal to said feed angle whereby the locus of all points of contact of a helical line on the rotating work roll with the rotating and advancing work is a circle in a plane substantially perpendicular to the axis of the work, the lead of said helical surface being equal to the length of the article plus such allowance and the entrance end portions of said helical surfaces being arranged to admit the work between them and the delivery end portions being tapered to relieve the work before the work issues therefrom.

6. A mill for cross-rolling stock into profiled work of circular cross-section, said mill comprising equidistant work rolls arranged to form a pass, each of said rolls being disposed at an ordinary feed angle to said pass and having a profiled helical band of multiple turns and of a lead angle equal to the feed angle.

7. A mill for cross-rolling stock into profiled work of circular cross-section, said mill comprising equidistant work rolls arranged to form a pass, each of said rolls being disposed at a feed angle of from two to twelve degrees to said pass and having a profiled helical band of multiple turns and of a lead angle equal to the feed angle, the delivery end portions of said rolls tapering sufficiently to relieve the work before the same leaves the pass.

PAUL KLAMP.